United States Patent
Fitzgerald

(10) Patent No.: US 10,772,437 B1
(45) Date of Patent: Sep. 15, 2020

(54) BEDDING SUPPORT DEVICE

(71) Applicant: Danny R. Fitzgerald, Williamsville, MO (US)

(72) Inventor: Danny R. Fitzgerald, Williamsville, MO (US)

( * ) Notice: Subject to any disclaimer, the term of this patent is extended or adjusted under 35 U.S.C. 154(b) by 457 days.

(21) Appl. No.: 15/704,039

(22) Filed: Sep. 14, 2017

(51) Int. Cl.
*A47C 21/02* (2006.01)
*A61G 7/05* (2006.01)
*B29D 22/02* (2006.01)
*F04D 25/04* (2006.01)
*F04D 25/08* (2006.01)
*F04D 27/00* (2006.01)

(52) U.S. Cl.
CPC .......... *A47C 21/024* (2013.01); *A61G 7/0501* (2013.01); *B29D 22/02* (2013.01); *F04D 25/04* (2013.01); *F04D 25/08* (2013.01); *F04D 27/00* (2013.01)

(58) Field of Classification Search
CPC ..... A47C 21/024; A47C 21/02; A47C 20/021; A61G 7/0501; B29D 22/02; F04D 25/04; F04D 25/08; F04D 27/00
See application file for complete search history.

(56) References Cited

U.S. PATENT DOCUMENTS

| | | | | |
|---|---|---|---|---|
| 1,577,089 A | * | 3/1926 | Whitford | A47C 21/024 5/505.1 |
| 2,598,295 A | * | 5/1952 | Pelton | A47C 21/024 5/505.1 |
| 3,571,828 A | * | 3/1971 | Bergsgaard | A61G 7/0755 5/651 |
| 3,639,929 A | * | 2/1972 | Ichise | A47C 20/021 5/648 |
| 3,803,645 A | * | 4/1974 | Oliverius | A47C 20/00 5/650 |
| 4,214,327 A | * | 7/1980 | Smith | A47C 21/024 5/426 |
| 4,570,275 A | | 2/1986 | Merriman | |
| 4,841,589 A | * | 6/1989 | Moore | A61G 7/0501 5/505.1 |
| 5,175,899 A | * | 1/1993 | Lou | A47C 20/022 5/421 |

(Continued)

FOREIGN PATENT DOCUMENTS

GB          2177910 A    *  2/1987  .......... A61G 7/0501

*Primary Examiner* — Robert G Santos
*Assistant Examiner* — Rahib T Zaman
(74) *Attorney, Agent, or Firm* — Suzanne Kikel, Patent Agent

(57) ABSTRACT

A bedding support device for use on a mattress to retain bedding, such as a sheet, away from the feet of an individual includes an inflatable housing assembly having a base, a riser unitary with the base, and an overhang unitary with the riser portion and spaced away from the base to define an open space for accommodating the feet of the individual when the inflatable housing assembly is inflated and a flat member positioned between the mattress and box springs. A backing member affixed to the housing assembly includes a fastener, and a backing member affixed to the flat member includes a fastener for engaging the fastener of the inflatable housing assembly for anchoring the inflatable housing assembly in a stable position onto the top of the mattress. The device is easily deflated for storage and/or packaging and can be used on any size bed.

15 Claims, 5 Drawing Sheets

(56) References Cited

U.S. PATENT DOCUMENTS

| | | | | |
|---|---|---|---|---|
| 6,240,581 B1* | 6/2001 | Pender | ................ | A47C 21/024 |
| | | | | 5/505.1 |
| 6,834,403 B1* | 12/2004 | Elliott | ................ | A61G 7/0501 |
| | | | | 5/426 |
| 7,231,680 B1 | 6/2007 | Hafford et al. | | |
| 7,281,282 B2* | 10/2007 | Huber | ................ | A47C 21/022 |
| | | | | 5/504.1 |
| 7,555,795 B1* | 7/2009 | Feil | ................ | A47C 20/021 |
| | | | | 5/505.1 |
| 7,617,552 B2* | 11/2009 | Strickland | ............ | A47C 21/024 |
| | | | | 5/505.1 |
| 7,874,029 B2* | 1/2011 | Alston | ................ | A47C 21/024 |
| | | | | 5/503.1 |
| 8,272,086 B1* | 9/2012 | Calmes | ................ | A47C 21/024 |
| | | | | 5/505.1 |
| 8,490,229 B2* | 7/2013 | Mintz | ................ | A47G 9/0246 |
| | | | | 5/485 |
| 8,978,182 B2* | 3/2015 | Receveur | ............ | A61G 7/0506 |
| | | | | 5/615 |
| 9,066,598 B1* | 6/2015 | Sears | ................ | A47C 16/02 |
| 9,161,632 B1* | 10/2015 | Tomaini | ................ | A47C 20/021 |
| 2005/0273931 A1* | 12/2005 | Edwards | ............ | A47C 21/022 |
| | | | | 5/505.1 |
| 2008/0295247 A1* | 12/2008 | Rogers | ................ | A47C 21/024 |
| | | | | 5/505.1 |
| 2010/0319127 A1* | 12/2010 | Sanders | ............ | A47C 21/024 |
| | | | | 5/505.1 |
| 2015/0305511 A1 | 10/2015 | Lenz | | |

* cited by examiner

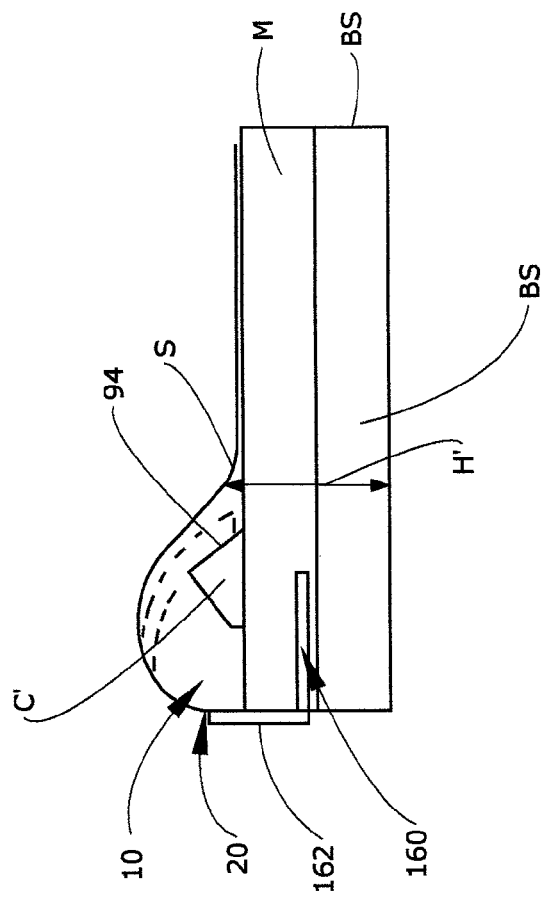
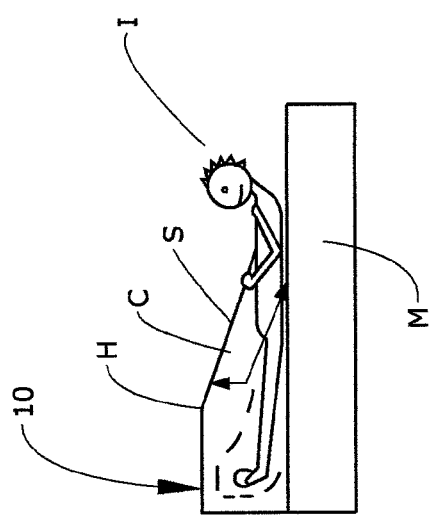
FIG. 4
FIG. 5

BEDDING SUPPORT DEVICE

BACKGROUND OF THE INVENTION

1. Field of the Invention

The present invention relates to the general art of bedding, and to the particular field of devices that support and raise the bedding above the feet of an individual when resting on a bed.

2. Brief Description of the Prior Art

The conventional mattress for sleeping is generally flat. It may be experienced by some people that when sleeping face-up on the mattress the weight of the bedding, such as sheets, comforters, and blankets, presses against the upwardly pointed toes of the individual. That is, in cold seasons when a heavy weight comforter and/or blankets are used, discomfort to the upwardly pointed toes may occur, especially at the foot area of the bed in that the toes of the individual are forced to support a substantial weight of the bedding. In view of this experienced pressure against the toes, it may be difficult for the person to fall asleep unless he changes his sleeping position or tilts his feet. This situation may be especially bothersome for tall people or those who are inflicted with a disease. Even if a light electrical blanket is used, its weight may still be beyond the endurance of the toes of the individual in supporting the blanket for any length of time. Moreover, the electrical blanket generally does not have any heating elements along its edge area and therefore does not supply enough heat to the foot area of the bed which usually requires heat, especially for elderly people.

Even though the old style bed has rails or a board guard at the foot of the bed, this hard foot end guard is designed to keep the bedding from slipping off of the bed, and not to support and/or raise the bedding away from the feet of an individual in order to lessen the weight of the bedding at the foot of the bed nor is this hard foot end guard designed to provide enough warmth in this foot area of the bed.

Also, in many instances, this hard foot end guard is uncomfortable for the feet. There are several medical and/or cosmetic reasons in which an individual who is lying on the bed with his feet under the bedding does not wish for the bedding to touch his feet and/or for the bedding to rest against his feet.

In the U.S. alone, there is about a 7.4 billion dollar market for nail and cosmetic foot care. Customers who get a pedicure and/or other foot treatments tend to be repeat customers. Many foot products produce lasting benefits and have increased effectiveness when applied overnight. Socks and other foot coverings worn to protect the bedding from touching the feet are generally designed for absorbing the applied foot product resulting in diminishing or lessening the effectiveness of the applied foot product.

For pedicures, it is recommended that the nail polish be allowed to dry for about two hours or longer. Customers who frequent spas may wish to nap and/or cover their feet and legs with a blanket without the fear of spoiling the nail polish or foot treatment. Individuals applying nail polish at home may wish to do so before going to bed. Currently, pedicures cannot be offered at the beach in view of the risk that sand may spoil the nail polish and/or in view of the impracticality of covering the feet when the nail polish is just applied.

There are a substantial number of people who find the weight and/or pressure of the bedding against their feet uncomfortable. Medical conditions which contribute to or exacerbate this sensitivity include diabetes, gout, pregnancy, arthritis, and bone and soft-tissue injuries and deformations. In certain situations, it is also desirable to place a cover over an individual's feet to allow a treatment or medical product to dry or be absorbed into the skin without concern for exposure to contaminants, such as dust and sand.

For example, arthritis is a particularly troublesome disease for certain people when it comes to sleeping. For these people who are affected with diseases such as rheumatoid arthritis, skin disease, bed sores, etc., one of the most uncomfortable and painful occurrences is that of having the bedding laying directly against and being supported by an affected area of the body, particularly, the feet. For example, it is not unusual for an individual with rheumatoid arthritis to have very sensitive and sore feet, and therefore, cannot tolerate any touching or pressure created by the overlying bedding. Oftentimes, the pain caused by this situation prevents the individual or patient from sleeping or resting comfortably, all of which compound the problems for the patient.

Furthermore, diabetes is a disease that is rapidly spreading throughout the world with more and more people are being diagnosed regularly. This disease can range from very mild to very severe. It is common to find children as well as older adults have diabetes.

The severity of diabetes depends on the symptoms and the degree of the symptoms and tends to effect the feet of many people, especially if the disease is in an advanced state. An individual may suffer from mild discomfort and irritation to advanced swelling of the feet. These symptoms generally increase when one is lying in bed. The weight of the bedding against the feet may cause distress and/or discomfort which may make it difficult for the person to sleep, thus resulting in many restless, sleepless nights. Currently, these problems brought on by diabetes remain relatively unaddressed.

Diabetics are not the only ones that may have potential problems involving pressure against their feet brought on by the bedding such as sheets, blankets and/or comforters. For instance, tall people may experience pressure against their feet caused by the weight of the bedding, particularly if their feet are too close to the foot of the bed thereby creating an uncomfortable sleeping environment. If an individual has back problems, the pressure placed on the feet by the weight of the bedding may compound the back problems.

While there may be some devices currently available in the market place which may be used to keep the weight of the bedding away from the feet of an individual, these devices may be burdensome to use and/or to install, and some devices may even extend beyond the scope of simply keeping the bedding lifted away from the feet of the individual.

There is, therefore, a need in the art to provide a simple, cost-effective bedding support device which prevents the bedding from touching the feet of the individual during resting and/or sleeping, and which bedding support device alleviates or lessens any discomfort and/or pain associated with the weight of the bedding against the individual's feet and which individual may experience foot related problems or sensitivity related to many types of diseases.

There is a further need in the art to provide a bedding support device for keeping and/or supporting the bedding away from or above the mattress and which device is easy to install, is adjustable, and is convenient to use.

SUMMARY OF THE INVENTION

The present invention provides such bedding support device. The invention provides a bedding support device that raises the bedding, such as sheets, blankets, and/or comforters away from the mattress and defines a volume or space in which an individual's feet can be comfortably placed on the mattress and beneath the bedding. The bedding support device of the invention comprises an inflatable housing assembly and a relatively flat member which is installed at the foot of a bed and which is connected together. The inflatable housing assembly includes a shell that is inflated so to raise the bedding away from the top of the mattress in order to provide a tent-like area for placement of the individual's feet and to prevent the pressure and/or weight of the bedding from touching and/or resting against the person's feet and at the same time essentially keeping the individual's feet warm. The inflatable housing assembly includes a base, a riser, and an overhang portion.

The riser is unitary with the base and extends upwardly from the base when the inflatable housing assembly is inflated. The overhang portion is unitary with the riser and is spaced away from the base and is arranged to extend over and above the base when the inflatable housing assembly is inflated and is supported on the mattress. The overhang portion includes a forward end which is spaced away from the riser. The base, the riser, and the overhang portion of the inflatable housing assembly define an open space area for accommodating the feet of the individual when the inflatable housing assembly is inflated, and the overhang portion pivots toward and away from the mattress and defines an angle β between the base and the overhang portion. Inflation of the housing assembly changes this angle a desired amount according to the amount of pressurized air inserted into or extracted from the interior air chamber formed by the outer shell of the housing assembly.

The inflatable housing assembly has a backing member which is flexible and which extends downwardly and the flat member has a backing member which is flexible and which extends upwardly along the mattress in a manner so as to meet and engage the backing member of the inflatable housing assembly. The backing member of the flat member includes a fastener which engages with a fastener of a backing member of the inflatable housing assembly so as to anchor the inflatable housing assembly to the flat member. The inflatable housing assembly includes an inflatable, flexible shell which is inflated so as to raise and maintain the bedding away from and above the mattress to create this tent-like area for the feet of the individual. The present invention is structured such as to allow an individual to comfortably rest with the bedding spaced away from his feet. The bedding remains in a desired position away from the individual's feet. The backing member of the flat member and the backing member of the inflatable housing assembly comprises essentially a flat sheet of material, such as canvas or nylon, and the fastener for both backing members comprise a strip of Velcro® hook and loop material which has a width such as to enable a desired adjustment of the inflatable housing assembly relative to the flat member depending on the depth of the mattress. That is, the strip of Velcro® hook and loop material can be positioned along the width of the corresponding strip of Velcro® hook and loop material in order to securely attach the inflatable housing assembly to the flat member, which, in turn, is positioned between the bed springs and the mattress of the bed.

These and other features and advantages of the present invention will be better appreciated and understood when the following description is read in light of the accompany drawings.

BRIEF DESCRIPTION OF THE DRAWINGS

The components in the figures are not necessarily to scale, emphasis instead being placed upon illustrating the principles of the invention. Moreover, in the figures, like referenced numerals designate corresponding parts throughout the different views.

FIG. 4 is a schematic side view of the bedding support device supported on a mattress and in a non-inflatable position.

FIG. 5 is a schematic side view of the bedding support device supported on a mattress and showing an overhang portion of the device being rotated in various positions as the inflatable housing assembly is being inflated.

DETAILED DESCRIPTION OF THE INVENTION

Figure 3:
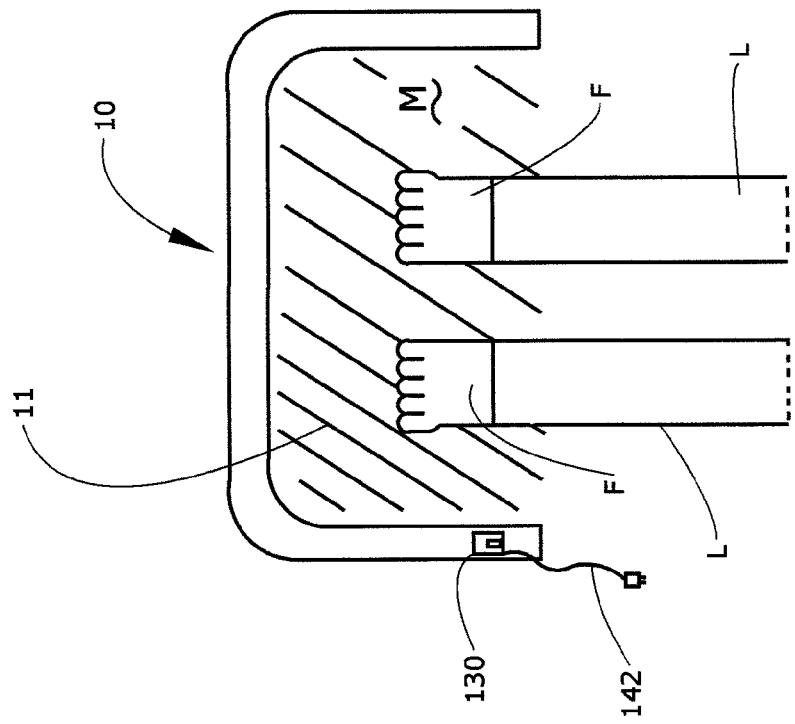
FIG. 3 is a schematic, partial top view of the bedding support device installed on a mattress and in a non-inflatable position.

Referring to FIGS. 1 through 10, it can be understood that the present invention is embodied in a bedding support device 10 which generally can be used at the foot 11 of a bed to support a sheet S above the feet F of an individual I when lying on the bed. As illustrated particularly in FIG. 1, the bed contains sheet S and pillows P, and at the foot 11 of the bed, the bedding support device 10 is positioned on the bed for operation by the individual. FIG. 3 schematically illustrates a partial view of the feet F and legs L of the individual supported and resting inside bedding support device 10. FIG. 4 illustrates the individual I resting on mattress M of the bed with his feet being inside bedding support device 10 of the invention.

Figure 1:
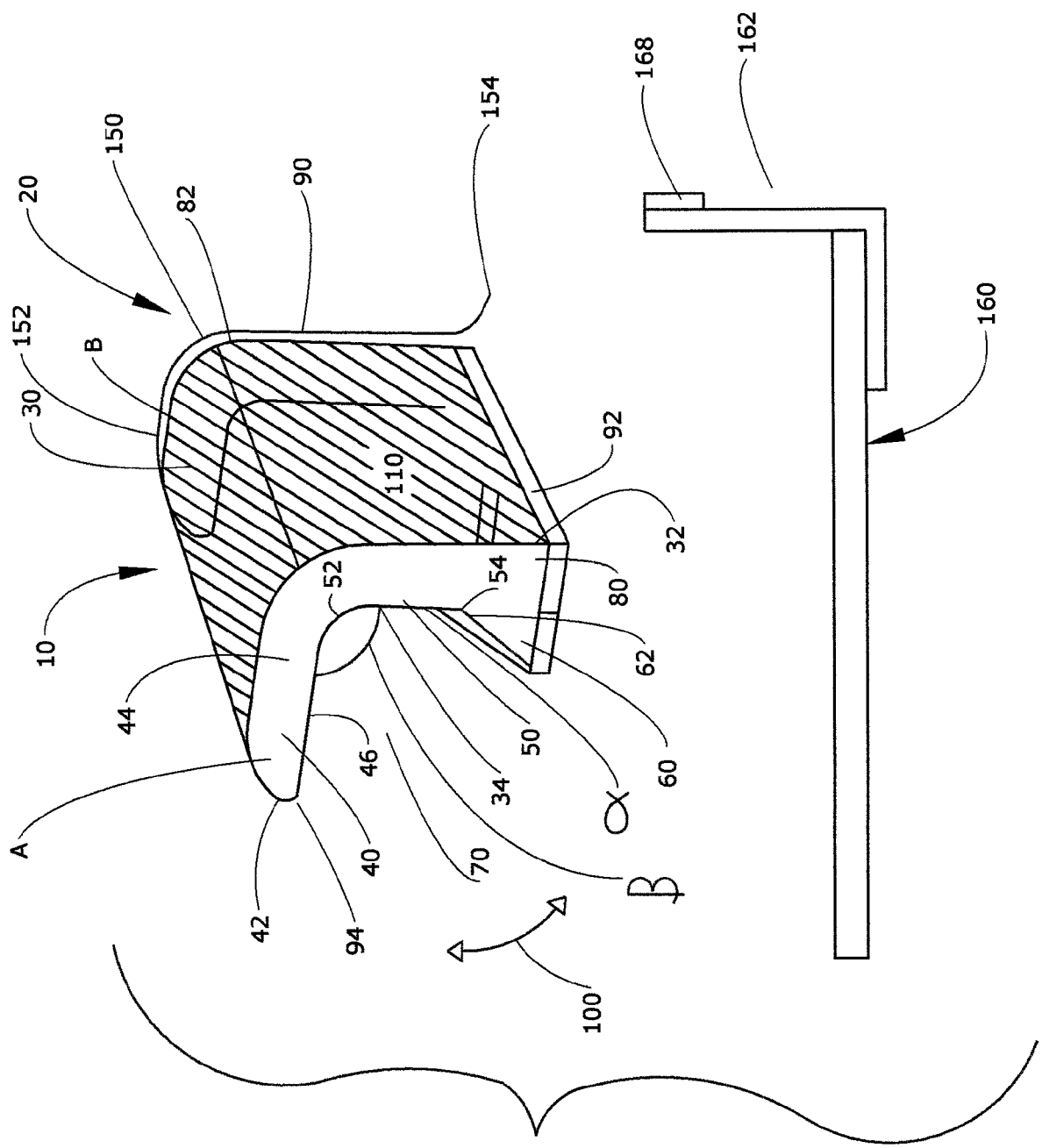
FIG. 1 is a schematic perspective side view of a bedding support device of the present invention in an inflatable position.

As particularly illustrated in FIG. 1, bedding support device 10 comprises an inflatable housing assembly 20, more of which is discussed herein. Inflatable housing assembly 20 is in an inflatable position, is a one-piece unit, and is C-shaped in cross section. Inflatable housing assembly 20 includes a shell 30 which is made of flexible material and which shell 30 is inflatable. Shell 30 has two sides indicated by reference numeral A on the right in FIG. 1 and an opposite side B located to the left in FIG. 1. Both sides A and B are identical, however, only the description of Side A will be discussed herein below.

Side A of shell 30 has a first side wall 32 and a second side wall 34 which form the C-shape configuration. Second side wall 34 has a first portion which is an upper portion 40 that extends towards foot 11 of mattress M, and which mattress M directly supports inflatable housing assembly 20 when shell 30 is in an operative, inflated position on mattress M.

Still referring particularly to FIG. 1, upper portion 40 of second side wall 34 has an extended forward end 42, a rear end 44, and an undersurface 46 which faces mattress M when shell 30 is in an operative position. Second side wall 34 further includes a second portion which is a lower portion 50 and which extends downwardly from upper portion 40. Lower portion 50 has a first end 52 which is contiguous to rear end 44 of upper portion 40 of second side wall 34 and a second end 54 spaced away from and contiguous to first end 52 of lower portion 50.

Still referring particularly to FIG. 1, second side wall 34 of shell 30 further includes a third portion which is a bottom portion 60 for shell 30 and which bottom portion 60 has a first end 62 contiguous to and connected to second end 54 of lower portion 50 of second side wall 34. Bottom portion 60 of second side wall 34 extends at an oblique angle α away from lower portion 50 of second side wall 34 and towards mattress M when shell 30 is in an operative, inflated position on the mattress. As discussed herein above and with reference to FIG. 1, the opposite side B of inflatable housing assembly 20 has a similar C-shape configuration as that of side A of inflatable housing assembly 20 and is located to the left of inflatable housing assembly 20 in FIG. 1. Both sides A and B of inflatable housing assembly 20 give structure to form the C-shape configuration of shell 30.

Figure 6:
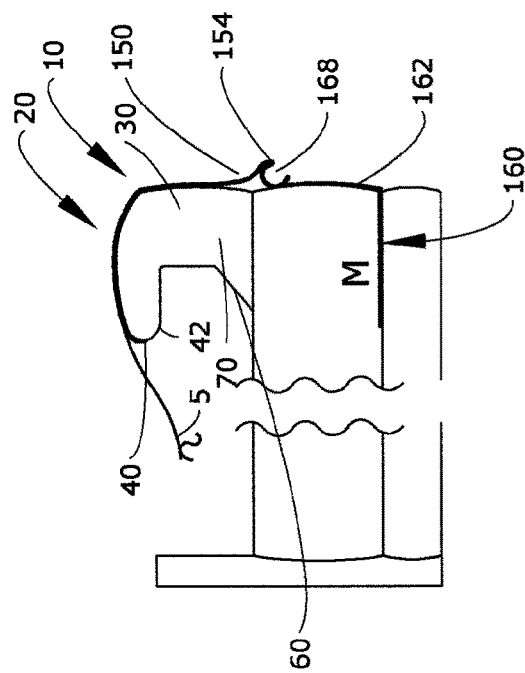
FIG. 6 is a schematic side view of the bedding support device of the invention installed on the foot of the mattress and in an inflated position, this side view being the reverse of that shown in FIGS. 4 and 5.
Figure 8:
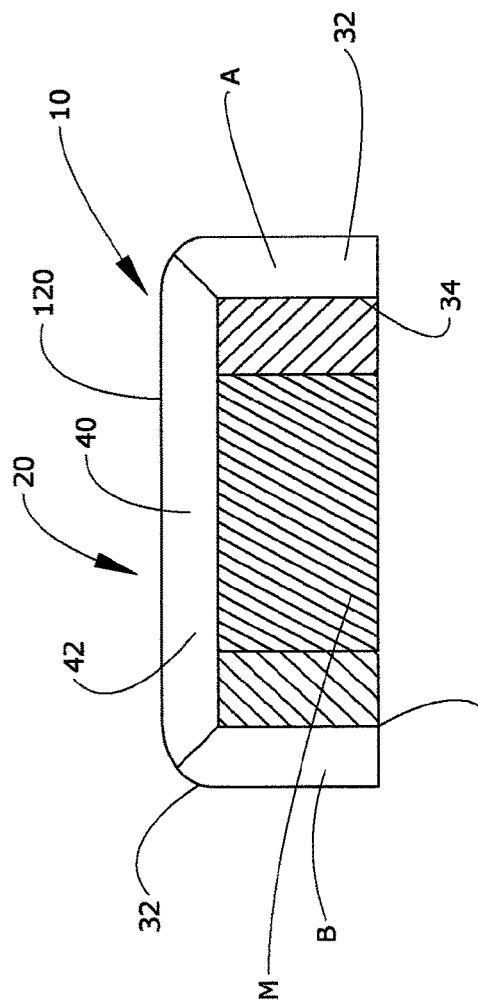
FIG. 8 is schematic cross-sectional top view of the bedding support device in position on a mattress and being in an inflatable position.

As is apparent from the figures, particularly from FIG. 6, when shell 30 is in an inflated, operative position on the mattress, inflatable housing assembly 20 defines an open space area indicated by reference numeral 70 for accommodating the feet of an individual when sheet S is arranged to overlay inflatable housing assembly 20.

Referring again to FIG. 1, side A of shell 30 of inflatable housing assembly 20 further includes a first end wall 80 and side B includes a second end wall 82. Both first and second end walls 80, 82 of sides A and B are formed by side walls 32 and 34 thereof. Both sides A and B of inflatable housing assembly 20 are bridged together via a riser portion 90 to form shell 30 with bottom portion 60 forming a base 92 for shell 30. Base 92 is directly supported by and rests on top of mattress M as particularly shown in FIGS. 2-6 for use of bedding support device 10. Sides A and B and riser portion 90 form shell 30 of inflatable housing assembly 20 and are contiguous relative to each other so as to form a contiguous air chamber within shell 30. Base 92 is attached to and supports sides A and B and riser portion 90 of shell 30. Base 92, support sides A and B, and riser portion 90 comprise a unitary construction for shell 30 with pressurized air being delivered into base 92, into sides A and B, and into riser portion 90 for inflation of housing assembly 20.

As best shown in FIG. 1, upper portion 40 of second side wall 34 of each of sides A and B forms an overhang 94. It is to be appreciated that overhang 94 is spaced away from the top surface MT (FIG. 10) of mattress M when shell 30 is in an operative, inflated position on the mattress. Overhang 94 is flexible so as to pivot toward and away from the mattress in directions indicated by a double-headed arrow 100 shown in FIG. 1 in order to change the angle β of the overhang 94 with respect to the mattress as air is pumped into and/or extracted out of shell 30. Second end 54 of lower portion 50 of second side wall 34 of both sides A and B of inflatable housing assembly 20 forms a forward section relative to overhang 94 when inflatable housing assembly 20 is in an operative, inflated position on the mattress.

As stated herein above, shell 30 is hollow inside and has an interior air chamber, which is not shown, but which is indicated by reference numeral 110 in FIG. 1 for receiving pressurized air, in a manner well-known to those skilled in the art.

Figure 2:
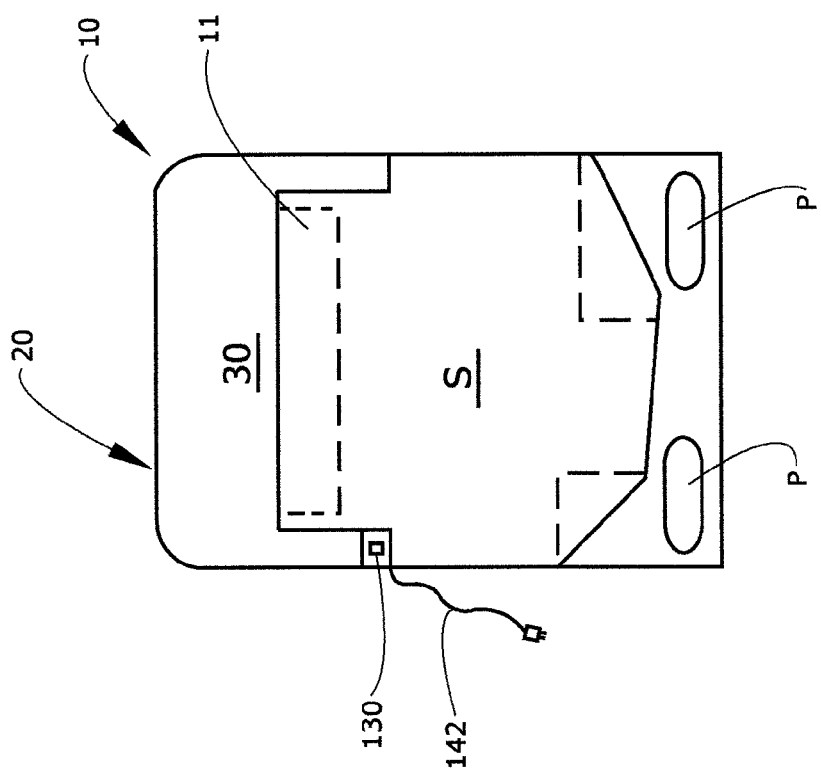
FIG. 2 is a schematic top view of the bedding support device of the invention installed on a mattress and in a non-inflatable position.
Figure 7:
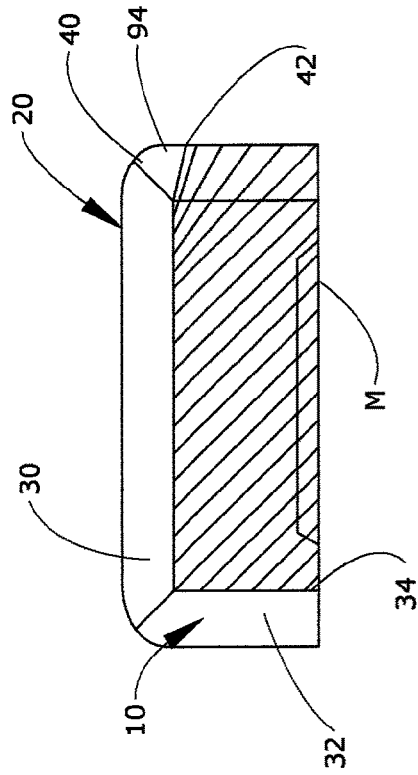
FIG. 7 is a schematic, cross-sectional end view of the bedding support device of the invention installed on the foot of a mattress and in an inflatable position.

Referring particularly to FIGS. 2 and 3, an air pump 130 is mounted on shell 30 of housing 20. Air pump 130 is fluidically connected to the interior air chamber (not shown) of shell 30 of inflatable housing assembly 20. In order to inflate shell 30, air pump 130 is operated such that shell 30 is caused to be inflated and erected into the C-shape configuration shown in the various figures. Referring particularly to FIG. 1, the pumping of air into the air chamber of shell 30 can also change the extent of the inflation or flexibility of inflatable housing assembly 20 in order to change angle β between overhang 94 and riser portion 90 of shell 30, and thus, to change the angle β of overhang 94 with respect to the mattress. As best shown schematically in FIGS. 4 and 5, the changing of angle β, changes the elevation H between sheet S and mattress M thereby altering the volume of space in compartment C defined between sheet S and mattress M in order to accommodate the individual's feet. This change in elevation is best appreciated by comparing FIGS. 4 and 5 wherein indicator H in FIG. 4 is changed to H' in FIG. 5, and wherein the size of volume of space in compartment C in FIG. 4 is enlarged as indicated by C' in FIG. 5.

Figure 9:
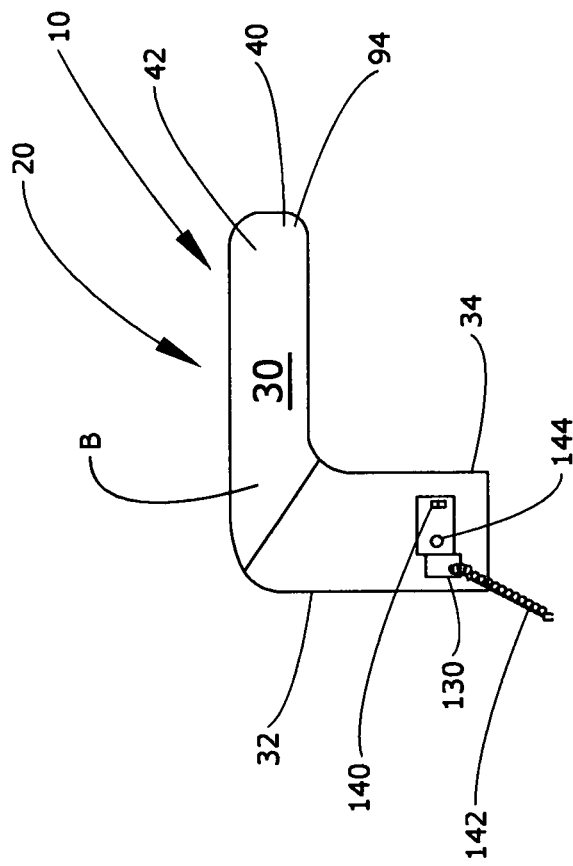
FIG. 9 is a schematic side view of the bedding support device of the invention in an inflatable position.

With particular reference to FIG. 9, a control switch 140 is mounted on shell 30 and is provided to electrically connect air pump 130 to a power source (not shown) via a cord 142. An air port 144 is provided on inflatable housing assembly 20 and is fluidically connected to the interior air chamber of shell 30 in order to deflate housing assembly 20 so that the inflatable housing assembly 20 can be stored and/or to adjust the amount of air in the air chamber of shell 30 a desired amount in order to raise the bedding away from the individual's feet a desired amount in a manner which can be appreciated by one skilled in the art. That is, the amount of air pressure in housing assembly 20 determines the extent to which shell 30 is inflated and therefore raised away from the mattress and the feet of the individual.

Figure 10:
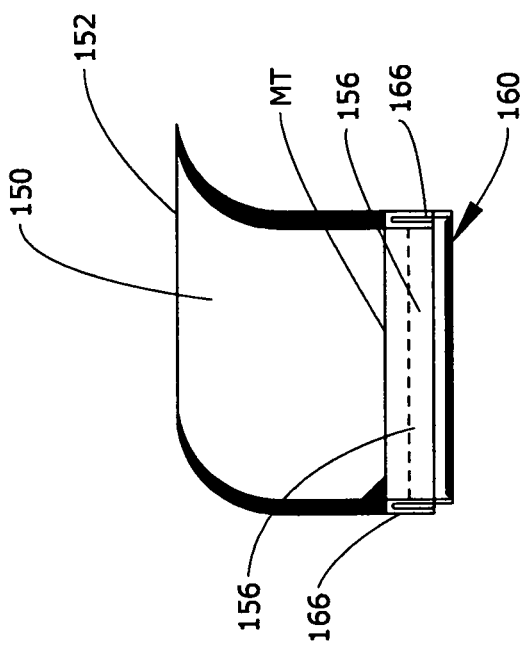
FIG. 10 is a schematic end view of the backing members for the bedding support device of the invention.

Referring particularly to FIGS. 1, 6 and 10, inflatable housing assembly 20 further includes a backing member 150. As shown particularly in FIG. 1, backing member 150 is essentially a flat sheet of material and is fixedly attached through suitable means, such as stitching or gluing, to forward end 42 of overhang 94 of sides A and B which form shell 30. Backing member 150 extends down over and beyond the lower end of riser portion 90. This arrangement can also be seen in FIGS. 1 and 6 where a first end 152 of backing member 150 extends around forward end 42 of overhang portion 94, and a second end 154 is spaced away from first side wall 32 of shell 30. As best shown in FIG. 10, backing member 150 further includes a fastener 156. Fastener 156 may be comprised of suitable fastening means, such as, for example, hook-and-loop fastener, such as, Velcro®.

As best shown in FIG. 1, and referring again to FIGS. 1, 6 and 10, bedding support device 10 further comprises a flat member 160, which is used to anchor inflatable housing assembly 20 against the top surface of the mattress. Flat member 160 includes a backing member 162 which is attached to a bottom portion of flat member 160 through suitable means, such as, for example, gluing or tacking. Backing member 162 is comprised of a suitable material, such as, canvas or other flexible materials. As best shown in FIG. 6, flat member 160 is arranged between the mattress and box spring, and remains there between when inflatable housing assembly 20 in installed on the mattress.

As particularly shown in FIGS. 1 and 10, backing member 162 includes a fastener 168 (FIG. 1). Fastener 168 may be comprised of suitable fastening means, such as, for example, hook-and-loop fastener, such as, Velcro®. Fastener 156 of backing member 150 of inflatable housing assembly 20 is affixed to fastener 168 of backing member 162 of flat member 160 to securely anchor inflatable housing assembly 20 to the mattress when bedding support device 10 is mounted onto the mattress. It is to be appreciated that the downward length of the fasteners 156, 168, especially, if hook-and-loop fasteners may be a desired dimension so that the backing member 150 of the inflatable housing assembly 20 can be adjusted relative to backing member 162 of the flat member 160, or vice versa so that the inflatable housing assembly 20 can be positioned on the mattress regardless of the depth of the mattress.

FIG. 10 shows the components for the arrangement for securing and therefore anchoring inflatable housing assembly to flat member 160. After flat member 160 is inserted between the mattress and bed springs, fastener 156 of backing member 150 of housing assembly 20 is affixed to fastener 168 of backing member 162 of flat member 160 so as to connect housing assembly 20 via backing member 150 to flat member 160 in order to securely mount and anchor housing assembly 20 to flat member 160, and therefore, to the mattress and box spring.

The attaching of inflatable housing assembly 20 via backing member 150 to flat member 160 via backing member 162 is such as to prevent inflatable housing assembly 20 of bedding support device 10 from slipping, sliding and/or rotating on the mattress. Housing assembly 20 remains in a fixed, stable position on the mattress in order to ensure that the feet of the individual are accommodated therein. As discussed herein above, the size of the space in chamber C can be adjusted by moving or adjusting backing member 162 of flat member 160 relative to backing member 150 of inflatable housing assembly 20. The coupling of backing members 150, 162 together results in adjusting overhang 94 an angle β for maximum comfort of the individual. Once in the selected orientation and positioning, bedding support device 10 remains in this desired position.

The backing member 162 of flat member 160 and the backing member 150 of the inflatable housing assembly 20 comprises essentially a flat sheet of material, such as canvas or nylon, and the fastener 156, 168 of backing members 150, 162, respectively, are comprised of a strip of Velcro® hook and loop material which has a predetermined width such as to enable a desired adjustment of the inflatable housing assembly 20 relative to the flat member 160 depending on the depth of the mattress. That is, the strip of Velcro® hook and loop material of the backing member 150 can be positioned along the width of the corresponding strip of Velcro® hook and loop material of backing member 162, and vice versa, in order to securely attach the inflatable housing assembly 20 to the flat member 160, which, in turn, is positioned between the bed springs and the mattress of the bed.

The flexible nature of inflatable housing 20 of bedding support device 10 allows housing assembly 20 to be deflated using port 144 (FIG. 9) when bedding support device 10 is not in use for easy storage and/or packaging of device 10. Bedding support device 10 can be manufactured in different sizes for use on any size bed.

As discussed herein above, inflatable housing assembly 20 is made of a flexible material and may be comprised of materials selected from those consisting of rubber, plastic and a combination thereof. Flat member 160 is relatively rigid and may be comprised of materials selected from those consisting of wood, plastic, acrylic, and a combination thereof. Backing member 150, 162 may be comprised of materials selected from those consisting of canvas, nylon and a combination thereof.

While the present invention has been described in connection with the preferred embodiment of the various figures, it is to be understood that other similar embodiments may be used or modifications and additions may be made to the described embodiment for performing the same function of the present invention without deviating there from. Accordingly, it is intended by the appended claims to cover all such changes and modifications as come within the spirit and scope of the invention.

What is claimed is:

1. A bedding support device for use on a mattress to retain bedding away from the feet of an individual, the device comprising:
   a relatively flat member located between a mattress and a box spring when the bedding support device in an operative position on the mattress;
   an inflatable housing assembly supported by the mattress when the bedding support device is in an operative position on the mattress;
   the inflatable housing assembly, comprising:
   a base portion;
   a riser portion unitary with the base portion and extending upwardly from the base portion when the inflatable housing assembly is inflated;
   an overhang portion unitary with the riser portion and spaced away from the base portion and arranged to extend over, above and away from the base portion when the inflatable housing assembly is inflated and supported by the mattress, the overhang portion including a forward end spaced away from the riser portion;
   the base portion, the riser portion and the overhang portion of the inflatable housing assembly defining an open space area for accommodating the feet of the individual when the inflatable housing assembly is inflated; and
   wherein the inflatable housing assembly comprises a backing member fixedly attached to the overhang portion and extending along the overhang portion and the riser portion and beyond the riser portion; and
   wherein the flat member comprises a backing member with a fastener;
   wherein the backing member of the inflatable housing assembly includes a fastener; and
   wherein the fastener of the backing member of the inflatable housing assembly and the fastener of the backing member of the flat member are arranged so as to be engaged relative thereto for anchoring the inflatable housing assembly onto the mattress.

2. The bedding support device of claim 1 wherein the flat member is relatively rigid and comprises a backing member for connecting the flat member to the inflatable housing assembly.

3. The bedding support device of claim 2 wherein the flat member consists of materials comprised of wood, plastic, acrylic, and a combination thereof.

4. The bedding support device of claim 1 wherein the inflatable housing assembly is a one-piece, flexible unit and defines an air chamber for receiving pressurized air.

5. The bedding support device of claim 1 wherein the inflatable housing assembly is comprised of a shell which is a one-piece, flexible unit and which defines an air chamber for receiving pressurized air.

6. The bedding support device of claim 1 wherein the inflatable housing assembly is comprised of materials selected from the group consisting of rubber, plastic, and a combination thereof.

7. The bedding support device of claim 1 wherein the fastener of the backing member of the inflatable housing assembly and the fastener of the flat member comprise a hook-and-loop fastener.

8. The bedding support device of claim 1 wherein the inflatable housing assembly is comprised of a shell made of a one-piece, flexible material so that the angle of the overhang portion with respect to the mattress can be adjusted using at least the backing member of the inflatable housing assembly.

9. The bedding support device of claim 5 further comprising an air pump mounted on the flexible shell and fluidically connected to the interior chamber of the inflatable housing assembly for inflating the shell by pumping air into the interior chamber to erect the flexible shell;
    a control switch mounted on the shell for electrically connecting the air pump to a power source; and
    a port located on the inflatable housing assembly and being fluidically connected to the interior chamber defined in the inflatable housing assembly and being used to deflate the inflatable housing assembly when the bedding support device is not in use for easy storage and packaging of the bedding support device.

10. A bedding support device for use on a mattress for keeping bedding away from the feet of an individual, the device comprising:
    a one-piece inflatable housing assembly which is C-shaped in cross section and which includes a shell having a first side, a second side spaced away from the first side, a riser portion located between the first side and the second side, and a base connecting the first side, the second side and the riser portion together;
    the first side and the second side of the shell each having a first portion which is an upper portion and which extends toward a foot of the mattress on which the shell is supported when the inflatable housing assembly is in operative position, the first portion having a forward end, a rear end, and an under surface which faces the mattress when the shell is in an operative position;
    the first side and second side of the shell each having a second portion contiguous with the first portion of each first side and second side;
    the first side and the second side of the shell each having a third portion contiguous with the second portion thereof and extending outwardly at an oblique angle away from the second portion and toward the mattress when the shell is inflated and in the operative position on the mattress;
    the first side, the second side, and the riser portion of the shell of the inflatable housing assembly forming an open space area for receiving the feet of an individual when the inflatable housing assembly is inflated and in an operative position on the mattress;
    the first portion of the first side and the second side of the shell forming an overhang portion which is spaced away from the mattress and structured to pivot toward and away from the base of the shell upon the inflating and deflating of the inflatable housing assembly;
    the first side, the second side and the riser portion of the shell further defining an interior air chamber;
    an air pump fluidically connected to the interior air chamber of the shell to inflate the shell when pumping air into the interior chamber;
    a control switch for electrically connecting the air pump to a power source; and
    a port associated with the shell and being fluidically connected to the interior chamber;
    wherein the shell further comprises a backing member fixedly attached to at least the riser portion of shell and structured to extend beyond the base of the shell of the inflatable housing assembly, the backing member including a fastener; and
    wherein the bedding support device further comprises a relatively flat member having a backing member structured to extend upwardly; and
    wherein the backing member of the flat member further includes a fastener constructed and arranged to engage the fastener of the backing member of the inflatable housing assembly to anchor the inflatable housing assembly onto the mattress.

11. The bedding support device of claim 10, wherein the backing member of the shell is affixed to an overhang portion of the shell and extends over the overhang portion, over a first side wall of the shell and beyond a second end wall of the first side and second side of the shell;
    wherein the backing member has a first end which extends around the overhang portion and a second end spaced away from the second end wall of the first side and second side of the shell; and
    wherein the fastener of the backing member of the shell includes a hook-and-loop fastener; and
    wherein the fastener of the backing member of the flat member includes a hook-and-loop fastener for engagement with the hook-and-loop fastener of the backing member of the shell for anchoring the inflatable housing assembly onto the mattress.

12. A bedding support device for retaining bedding in a raised position, the device comprising:
    a one-piece inflatable housing assembly which is C-shaped in cross section and which includes:
    a flexible shell having a first side wall and a second side wall having a C-shaped configuration and located opposite to the first side wall;
    the second side wall having a first portion which is an upper portion and which extends toward a foot of a mattress on which the flexible outer shell rests when the flexible shell is in the use position on the mattress, the first portion having a forward end, a rear end, and an under surface which faces the mattress when the flexible shell is in the use position on the mattress;
    the second side wall further including a second portion which has a first end and a second end, the first end attached to the rear end of the first portion of the second side wall and the second end spaced away from the first end of the second portion, the second portion of the second side wall being linear and extending toward the mattress when the flexible shell is in the use position on the mattress; and
    the second side wall of the flexible shell further including a third portion having a first end attached to the second end of the second portion of the second side wall and extending at an oblique angle away from the second portion of the second side wall and toward the mattress when the flexible shell is in the use position on the mattress;

wherein the inflatable housing assembly further comprises:

a backing member fixed to the forward end of the overhang of the flexible shell and extending over the overhang, over the first side wall of the flexible shell, and beyond the second end wall, wherein the backing member includes a first end which extends around the first end of the overhang and a second end spaced away from the second end wall of the flexible shell; and wherein the backing member of the inflatable housing assembly further includes a hook-and-loop fastener.

13. The bedding support device of claim 12, wherein the second side wall defines an open space area for accommodating the feet of an individual when the inflatable housing assembly is in an inflated position on the mattress;

wherein the inflatable housing assembly further includes a first end wall and a second end wall, and wherein the first portion of the second side wall forms an overhang which is spaced apart from a top surface of the mattress when the flexible shell is in the use position on the mattress, the overhang being flexible to pivot toward and away from the mattress to change the angle of the overhang with respect to the mattress, the second end of the second portion of the second side wall forming a forward end of the overhang with respect to the mattress when the housing is in the use position on the mattress; and wherein the flexible shell defines an interior air chamber; and wherein the flexible shell further includes:

an air pump mounted on the flexible shell and being fluidically connected to the interior air chamber of the flexible shell;

a control switch mounted on the flexible outer shell for electrically connecting the air pump to a power source; and a port fluidically connected to the interior air chamber of the flexible shell and constructed and arranged to receive pressurized air from the air pump to inflate and to extract pressurized air to deflate the flexible shell of the inflatable housing assembly.

14. The bedding support device of claim 12, wherein the bedding support device further comprises a relatively flat member constructed and arranged to securely anchor the inflatable housing assembly to the mattress; and wherein the flat member includes a backing member with a fastener;

wherein the flat member is constructed to be positioned between the mattress and a box spring when the inflatable housing assembly is in an operative position on the mattress;

wherein the fastener of the backing member of the flat member includes a hook-and-loop fastener; and wherein the hook-and-loop fastener of the backing member of the flat member is constructed and arranged to engage the hook-and-loop fastener of the backing member of the inflatable housing assembly for securing the inflatable housing assembly to the mattress.

15. The bedding support device of claim 14, wherein the flexible shell of the inflatable housing assembly is comprised of materials selected from the group consisting of rubber, plastic, and a combination thereof;

wherein the flat member is comprised of materials selected from the group consisting of wood, plastic, acrylic, and a combination thereof; and wherein the backing member of the flexible shell and the backing member of the flat member are comprised of materials selected from the group consisting of canvas and nylon.

* * * * *